(12) United States Patent
Nishimura (10) Patent No.: US 12,553,377 B2
(45) Date of Patent: Feb. 17, 2026

(54) WATER OUTLET

(71) Applicant: NIPPON THERMOSTAT CO., LTD., Kiyose (JP)

(72) Inventor: Tetsuya Nishimura, Kiyose (JP)

(73) Assignee: NIPPON THERMOSTAT CO., LTD., Kiyose (JP)

( * ) Notice: Subject to any disclaimer, the term of this patent is extended or adjusted under 35 U.S.C. 154(b) by 35 days.

(21) Appl. No.: 18/712,325

(22) PCT Filed: Oct. 6, 2022

(86) PCT No.: PCT/JP2022/037397
§ 371 (c)(1),
(2) Date: Oct. 30, 2024

(87) PCT Pub. No.: WO2023/100472
PCT Pub. Date: Jun. 8, 2023

(65) Prior Publication Data
US 2025/0320830 A1    Oct. 16, 2025

(30) Foreign Application Priority Data
Nov. 30, 2021   (JP) .................................. 2021-194867

(51) Int. Cl.
*F01P 11/00* (2006.01)
*B60K 11/02* (2006.01)
(Continued)

(52) U.S. Cl.
CPC .............. *F01P 11/04* (2013.01); *B60K 11/02* (2013.01); *F01P 7/16* (2013.01); *F01P 2025/32* (2013.01)

(58) Field of Classification Search
CPC .......... F01P 7/14; F01P 11/04; F01P 2060/16; F01P 11/10; F01P 11/00; F16L 1/207;
(Continued)

(56) References Cited

U.S. PATENT DOCUMENTS 6,460,492 B1 * 10/2002 Black ........................ F01P 7/16
123/41.1
2006/0042566 A1    3/2006 Ito et al.
(Continued)

FOREIGN PATENT DOCUMENTS

CN      203347908 U * 12/2013
CN      105275576 A *  1/2016 .......... F16K 11/0876
(Continued)

OTHER PUBLICATIONS

International Search Report for PCT International Application No. PCT/JP2022/037397 dated Jan. 10, 2023, 4pp.
(Continued)

*Primary Examiner* — George C Jin
*Assistant Examiner* — Teuta B Holbrook
(74) *Attorney, Agent, or Firm* — HAUPTMAN HAM, LLP (57) ABSTRACT

In a water outlet, the deterioration of sealing performance is prevented by a sealing member sealing between a pipe and the connecting port of the water outlet. A water outlet is provided at a coolant outlet of an internal combustion engine to which a pipe leading coolant out of the engine is connected, having a dish-shaped body fixed to the engine, a cylindrical connecting port provided to rise outward from the body portion and to be inserted into the inside of the pipe, and a sealing member on the outer circumference of the connecting port. A convex portion is provided on the outer circumferential side of the connecting port to rise outward from the body, and an annular sealing member is provided between the connecting port and the pipe, and at least a circumferential portion of the pipe is disposed between the convex portion and the connecting port.

8 Claims, 9 Drawing Sheets

(51) Int. Cl.
  *F01P 7/16* (2006.01)
  *F01P 11/04* (2006.01)
(58) Field of Classification Search
  CPC ..... F16L 1/202; F16L 37/084; F16L 25/0036;
    F16L 25/00; F16L 25/0018; F16L 25/10;
    F16L 25/06; F16L 25/14; F16L 37/48;
    F16L 39/02; F16L 39/04; F16L 41/00;
    F16L 41/001; F02B 29/0443; B60H
    1/00528; B60K 11/02
  USPC .......... 285/921, 10, 136.1, 137.11, 307, 311,
    285/316, 319, 338; 123/41.44, 41.57,
    123/196 AN, 195 R; 138/107, 153, 155
  See application file for complete search history.

(56) References Cited

U.S. PATENT DOCUMENTS

| | | |
|---|---|---|
| 2009/0139471 A1 | 6/2009 | Shin |
| 2015/0000616 A1 | 1/2015 | Yamashiro et al. |
| 2015/0107344 A1 | 4/2015 | Hada et al. |
| 2016/0146092 A1* | 5/2016 | Lee ................... F01P 7/16 |
| | | 123/41.1 |

FOREIGN PATENT DOCUMENTS

| | | | | |
|---|---|---|---|---|
| CN | 206246250 U | * | 6/2017 | |
| CN | 110725743 A | * | 1/2020 | ............. F01P 11/00 |
| CN | 210502182 U | * | 5/2020 | |
| DE | 19701414 B4 | * | 6/2004 | ............. F16L 47/24 |
| DE | 19951429 B4 | * | 2/2005 | ............ F28F 9/0234 |
| EP | 2034155 A1 | | 3/2009 | |
| EP | 3139015 A1 | | 3/2017 | |
| JP | S57-102511 A | | 6/1982 | |
| JP | 2006-070760 A | | 3/2006 | |
| JP | 2006-105201 A | | 4/2006 | |
| JP | 2008-002400 A | | 1/2008 | |
| JP | 4105416 B2 | * | 6/2008 | |
| JP | 6069116 B2 | | 2/2017 | |
| WO | 2013/137043 A1 | | 8/2015 | |

OTHER PUBLICATIONS

European Patent Office, Extended European Search Report for European Patent Application No. 22900906.3 dated Oct. 10, 2025; 8 pp.

* cited by examiner

Water outlet

Fig. 9A          Fig. 9B

WATER OUTLET

RELATED APPLICATIONS

The present application is National Phase of International Application No. PCT/JP2022/037397 filed Oct. 6, 2022, and claims priority from Japanese Application No. 2021-194867, filed Nov. 30, 2021.

TECHNICAL FIELD

The present invention relates to a water outlet provided, for example, at a coolant outlet of an engine (internal combustion engine) and configured to guide a coolant to distribute the coolant to various devices such as a radiator and a thermostat.

BACKGROUND ART

For example, as disclosed in Patent Literature 1, a water outlet that guides and distributes a coolant to various devices such as a radiator is mounted on a coolant outlet of an engine of a vehicle. In this water outlet, a tubular connecting port is provided that is inserted into one end of pipes leading to various devices. The water outlet and various devices are connected by pipes or other conduits.

Meanwhile, depending on the vehicle, a mounting error occurs at the position of the water outlet to which one end of the pipe is connected and at the position of a device to which the other end of the pipe is connected. For this reason, when the pipe is formed of, for example, a hardly deformable synthetic resin, the pipe and the connecting port of the water outlet can be connected in a state in which relative movement in the axial direction and relative rotation in the circumferential direction are permitted to allow the mounting error.

Figure 8:
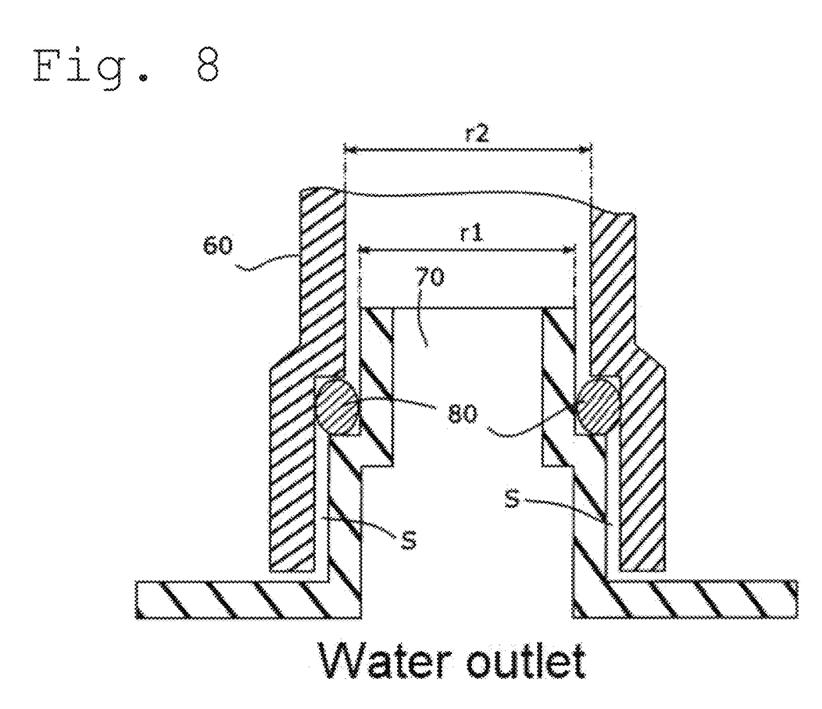
FIG. 8 is a cross-sectional view illustrating a connection state between a connecting port of a conventional water outlet and a pipe connected to the connecting port.

Specifically, as shown in FIG. 8, in the water outlet, a tubular connecting port 70 is provided in a state of standing outwards. The outer diameter r1 of the connecting port 70 is smaller than the inner diameter r2 of a tip portion of a pipe 60 (r1<r2). The pipe 60 is connected to the connecting port 70 by inserting into the pipe 60 in a state in which the seal member 80 is mounted on the outer periphery of the connecting port 70. As a result, relative movement in the axial direction and relative rotation in the circumferential direction between the pipe 60 and the connecting port 70 of the water outlet are permitted, and the mounting error can be absorbed. In addition, the seal member 80 is compressed between the connecting port 70 and the pipe 60 so as to liquid-tightly seal a space therebetween and to prevent the pipe 60 from being easily detached from the connecting port 70.

CITATION LIST

Patent Literature

PLT 1: JP-A-S57-102511

SUMMARY OF INVENTION

Technical Problem

According to the above configuration, since the outer diameter r1 of the connecting port 70 of the water outlet is smaller than the inner diameter r2 of the pipe 60, a gap s can be formed therebetween. When the gap s is formed as described above, the connecting port 70 and the pipe 60 respectively vibrate and move relatively in the radial direction, as indicated by the arrows in FIGS. 9A and 9B while a vehicle is running.

Figure 9A:
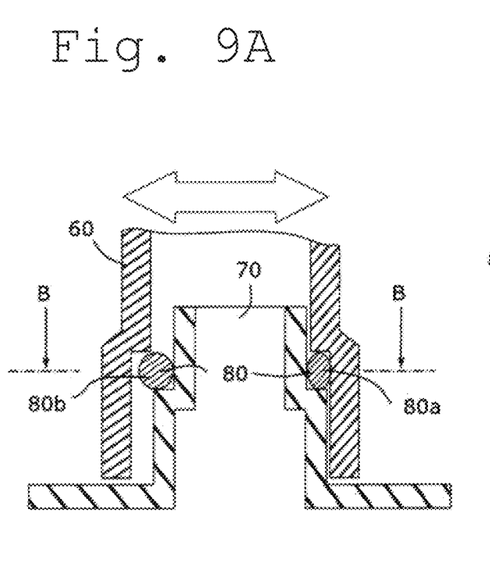
FIG. 9A is a cross-sectional view illustrating a state in which the connecting port of the water outlet and the pipe connected to the connecting port are relatively moved in the radial direction from the state in FIG. 8.
Figure 9B:
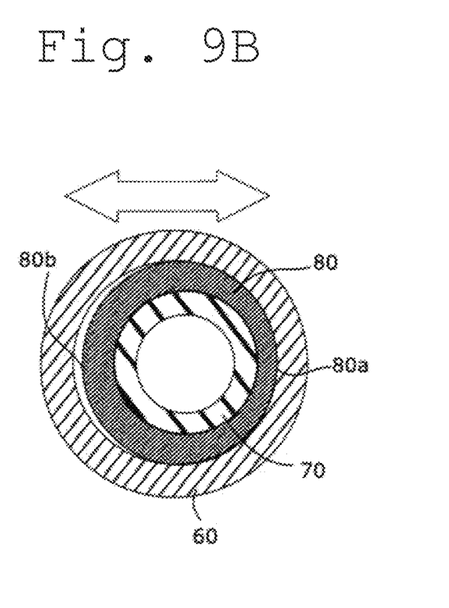
FIG. 9B is a cross-sectional view taken along line B-B in FIG. 9A.

However, when the relative movement between the connecting port 70 and the pipe 60 in the radial direction becomes large, a compression amount of a portion 80a of the seal member 80 in the circumferential direction becomes extremely large, and a compression amount (tightening allowance) of a portion 80b on the opposite side thereof becomes extremely small, so that there is a possibility that the sealing performance at the part deteriorates significantly.

The present invention has been made in view of the above-described points, and an object of the present invention is to provide a water outlet capable of preventing significant deterioration of sealing performance obtained by a sealing member that seals a space between a pipe and a connecting port of the water outlet to which the pipe is connected.

Solution to Problem

In order to solve the above problems, a water outlet according to the present invention is provided at a coolant outlet of an internal combustion engine and configured to allow a pipe to be connected thereto, the pipe leading a coolant to an outside of the internal combustion engine. The water outlet includes a dish-shaped body fixed to the internal combustion engine; a tubular connecting port provided so as to rise outwardly from the body and inserted into the pipe; and a protrusion provided on an outer circumferential side of the connecting port so as to rise outwardly from the body, in which an annular sealing member is provided between the connecting port and the pipe, and at least a part of the pipe arranged in a circumferential direction is disposed between the protrusion and the connecting port.

According to the configuration described above, when the relative movement between the connecting port and the pipe increases in the radial direction, the pipe comes into contact with the protrusion to suppress further relative movement. Therefore, it is possible to prevent a compression amount of a portion of the seal member in the circumferential direction from becoming extremely large, and to prevent a compression amount (tightening allowance) of a portion on the opposite side thereof from becoming extremely small, thereby making it possible to prevent significant deterioration in the sealing performance of the portion.

A gap may be formed between the connecting port and the pipe in the circumferential direction, and the protrusion may be disposed at a location so as to contact the pipe before the connecting port and the pipe contact each other when the connecting port and the pipe move relatively in the radial direction.

In addition, when the amount of relative movement in the radial direction between the connecting port and the pipe increases, the pipe contacts the protrusion before the pipe contacts the connecting port. Therefore, it is possible to reliably suppress an increase in the amount of relative movement in the radial direction between the connecting port and the pipe, and it is possible to reliably prevent significant deterioration in the sealing performance of the seal member.

Further, the protrusion may be formed in an arc shape in plan view when seen from an axial direction of the connecting port.

In this manner, when the pipe is connected to the water outlet, the protrusion can be used as a guide for guiding the pipe thereto. Furthermore, as compared with a case in which the protrusion is formed in an annular shape, the protrusion does not cause interference when the connecting port is inserted into the pipe, thereby making it possible to easily perform connection work of the pipe.

In addition, the protrusion may be formed to cover half of the circumference portion of the connecting port along a concentric circle of the connecting port.

In this way, even if a vibration direction changes slightly while the vehicle is running, the sealing performance of the sealing member is suppressed to be significantly deteriorated.

Furthermore, an annular gasket may be provided between the body and the internal combustion engine to surround the coolant outlet of the internal combustion engine, and both ends of the protrusion in the circumferential direction may be located on an outer peripheral side of the gasket.

Thus, it is possible to improve the effect of suppressing an outer peripheral portion of the body from being warped in a direction away from the internal combustion engine by a reaction force of the gasket, thereby making it possible to suppress deterioration in the sealing performance of the gasket.

In addition, a tip of the protrusion in a height direction may be at the same height as the height of the sealing member.

As a result, even if the sealing member is provided between the connecting port and the pipe, the connecting port can be easily inserted into the pipe. Therefore, the connection work of the pipe can be performed more easily.

In addition, a temperature sensor may be mounted on the body, and a pair of walls located on both sides, with the temperature sensing unit of the temperature sensor therebetween, is closer together toward the bottom of the body.

In this manner, the temperature sensing performance of the temperature sensor can be improved.

In addition, the pipe may be configured to lead the coolant to a thermostat fixed to a water pump that supplies the coolant to the internal combustion engine.

In such a case, the connecting port and the pipe move relatively in the radial direction due to vibration during the running of the vehicle, and the sealing performance of the sealing member may be significantly deteriorated. Therefore, it is particularly effective to provide the protrusion according to the present invention in the water outlet.

Further, the protrusion may be located on an upper side or a lower side of the connecting port in a state of being mounted on a vehicle.

When the vehicle is running, the pipe and the connecting port to which the pipe is connected thereto move relatively mainly in the vertical direction. Then, according to the configuration described above, since the relative movement in the vertical direction can be suppressed by the protrusion, it is possible to efficiently suppress significant deterioration in the sealing performance of the sealing member.

Advantageous Effects of Invention

With a water outlet of the present invention, it is possible to prevent significant deterioration of sealing performance with a sealing member that seals a space between a pipe and a connecting port of the water outlet to which the pipe is connected.

DESCRIPTION OF EMBODIMENTS

Hereinafter, a water outlet according to an embodiment of the present invention will be described with reference to the drawings.

Figure 1:
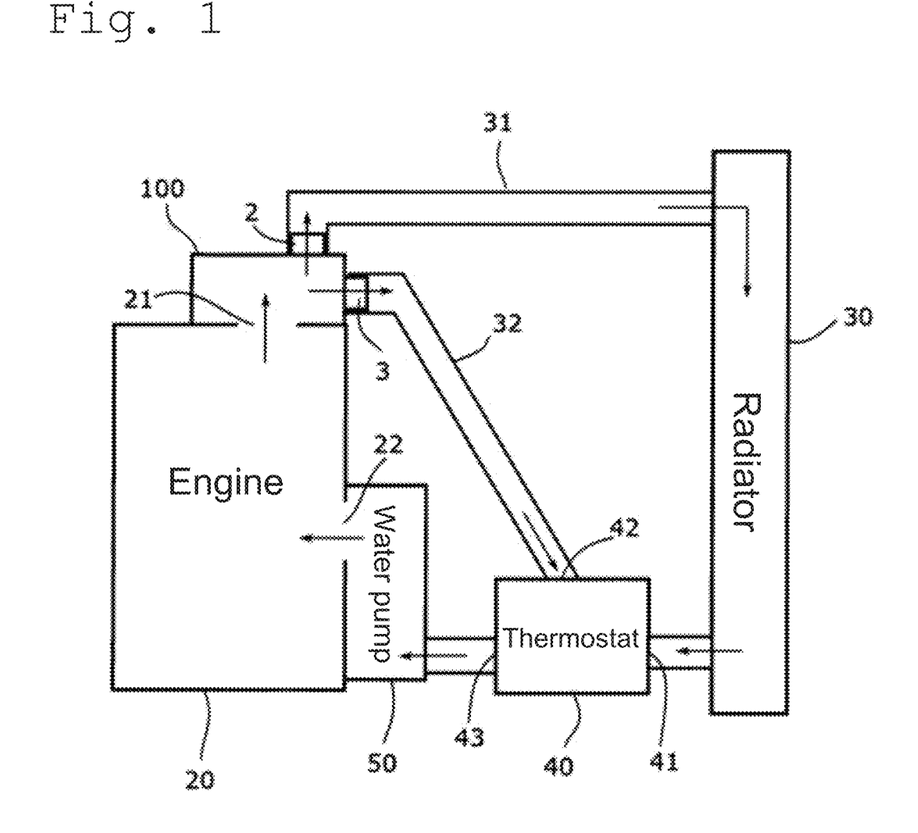
FIG. 1 is a block diagram illustrating an example of an engine cooling system to which a water outlet according to an embodiment is applied.
Figure 2:
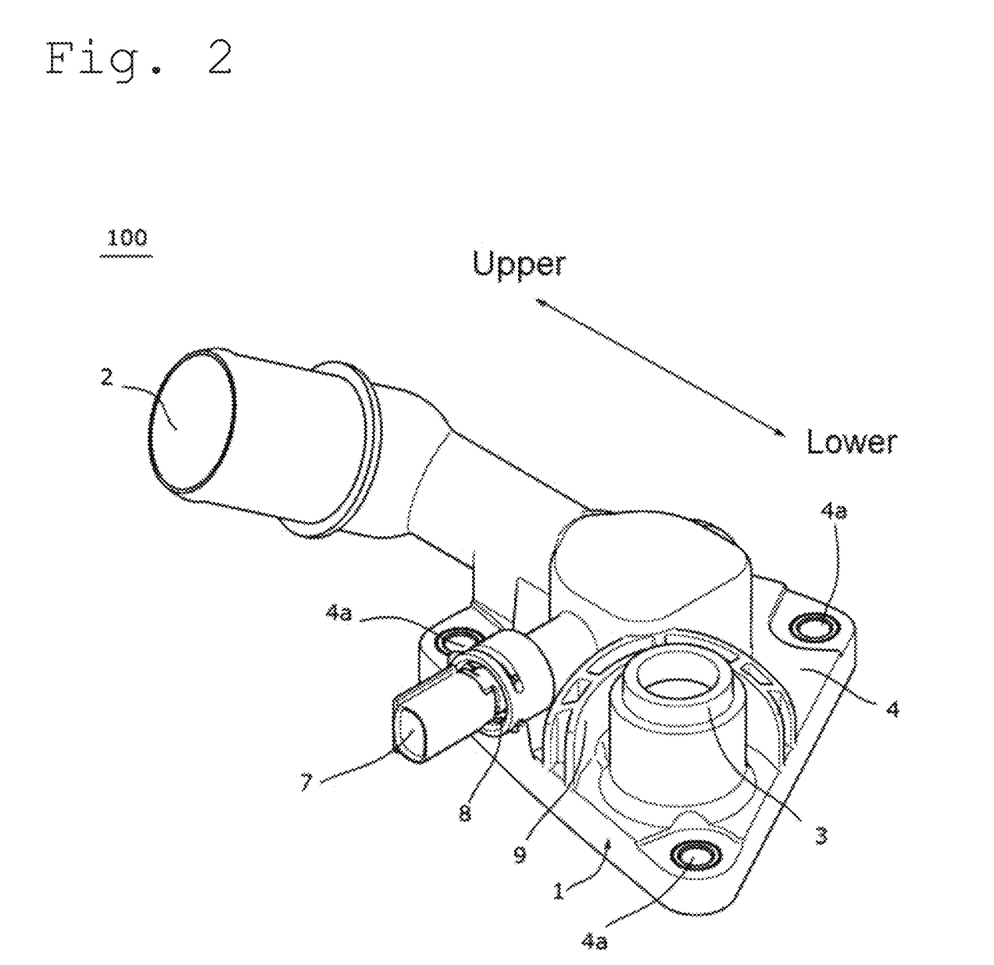
FIG. 2 is a perspective view of the water outlet according to the embodiment, as viewed from the front side.
Figure 3:
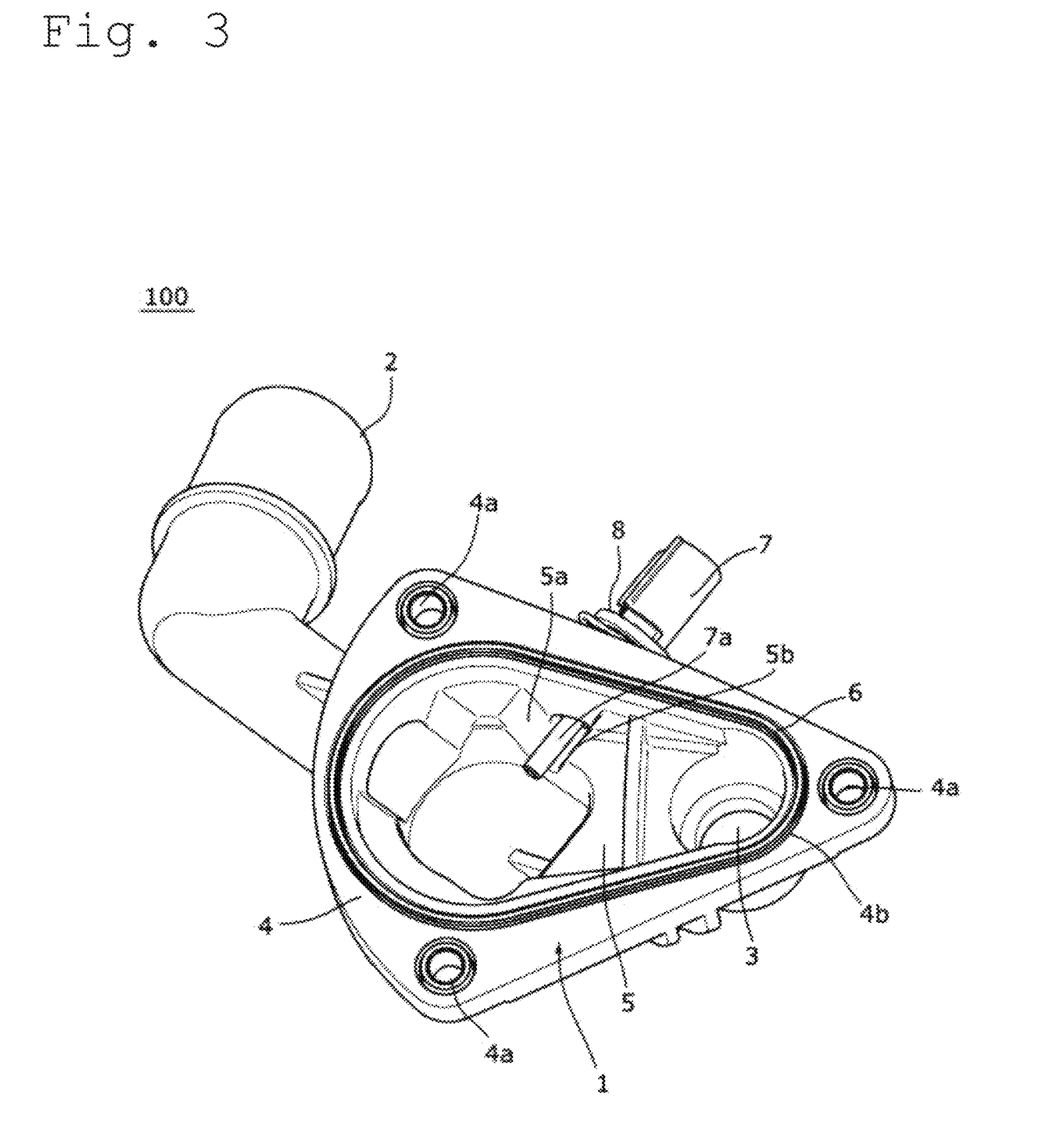
FIG. 3 is a perspective view of the water outlet in FIG. 1, as viewed from the backside.

FIG. 1 is a block diagram illustrating an example of an engine cooling system to which a water outlet according to the present invention is applied. FIG. 2 is a perspective view of the water outlet according to the present embodiment as viewed from the front side, and FIG. 3 is a perspective view of the water outlet in FIG. 1 as viewed from the backside.

As shown in FIG. 1, a water outlet 100 is mounted to cover a coolant outlet 21 of an engine (internal combustion engine) 20. A pipe 31 to direct a coolant to a radiator 30 and a pipe 32 to direct the coolant to a thermostat 40 while bypassing the radiator 30 are connected to the water outlet 100.

In the engine 20, a water pump 50 is mounted at a coolant inlet 22 for introducing the coolant, and the thermostat 40 is mounted on the water pump 50.

The thermostat 40 is fixed to an inlet of the water pump 50, for example, with a bolt and includes a first inlet 41 through which the coolant is introduced from the radiator 30, a second inlet 42 through which the coolant is introduced from the pipe 32 as a bypass flow path, and an outlet 43 through which the coolant is led out to the water pump 50.

When the temperature of the coolant discharged from the engine 20 through the pipe 32 is low, the thermostat 40 operates so as to close the first inlet 41 and to allow the second inlet 42 and the outlet 43 to communicate with each other. On the other hand, when the temperature of the coolant discharged from the engine 20 through the pipe 32 is high, the thermostat 40 operates so as to close the second inlet 42 and to allow the first inlet 41 and the outlet 43 to communicate with each other.

The water outlet 100 is formed of, for example, a synthetic resin and is fixed to a body of the engine 20 with a bolt so as to cover the coolant outlet 21 of the engine 20.

As shown in FIGS. 2 and 3, the water outlet 100 includes a dish-shaped body 1, a first connecting port 2 and a second connecting port 3 provided so as to rise outwardly from the body 1, and a protrusion 9 provided on the outer peripheral side of the second connecting port 3 so as to rise outwardly from the body 1.

An up-and-down direction shown in FIG. 2 is a vertical direction in a state in which the water outlet 100 is mounted on a vehicle.

One end of the pipe 31 is connected to the first connecting port 2. The coolant discharged from the coolant outlet 21 of the engine 20 flows toward the radiator 30 through the pipe 31. One end of the pipe 32 is connected to the second connecting port 3. The coolant discharged from the coolant outlet 21 of the engine 20 flows toward the thermostat 40 through the pipe 32.

Thus, the coolant discharged from the coolant outlet 21 branches at the water outlet 100 and flows toward the radiator 30 or the thermostat 40.

As shown in FIG. 3, the body 1 has a dish portion 5 having a concave shape so as to be separated from the engine 20, and a flange 4 protruding outwardly from an outer peripheral edge of the dish portion 5. A space defined between the dish portion 5 and the engine 20 serves as a flow passage of the coolant. The flange 4 is provided with a plurality of bolt holes 4a. A bolt (not shown) is inserted into each of the bolt holes 4a and is to be bolt-fastened to the body of the engine 20.

In a state in which the flange 4 is fixed to the engine 20 with the bolts, an opening of the dish portion 5 faces the coolant outlet 21 of the engine 20. The first connecting port 2 and the second connecting port 3 are provided so as to rise and protrude outwardly from the dish portion 5.

Further, as shown in FIG. 3, an annular groove 4b is formed in the flange 4. An annular gasket 6 is fitted into the groove 4b. The gasket 6 is disposed so as to surround the opening of the dish portion 5 and the coolant outlet 21 and prevents the coolant from leaking from a gap between the engine 20 and the flange 4.

As shown in FIGS. 2 and 3, a temperature sensor 7 is mounted on the water outlet 100. A temperature sensing unit 7a of the temperature sensor 7 is inserted into the inside of the dish portion 5 capable of detecting the temperature of the coolant.

As shown in FIG. 3, in the dish portion 5, a portion into which the temperature sensing unit 7a is inserted has a valley shape. More specifically, assuming that the side of the dish portion 5 facing the engine 20 is an opening side and the opposite side thereof is a bottom side, the dish portion 5 has a pair of wall portions 5a and 5b respectively located on the opposite sides thereof across the axis of the temperature sensing unit 7a of the temperature sensor 7. The pair of wall portions 5a and 5b come closer to each other as they move toward the bottom side and have a tapered shape. As a result, the coolant is easily collected on the temperature sensing unit 7a, and the temperature sensing performance can be improved.

Figure 4:
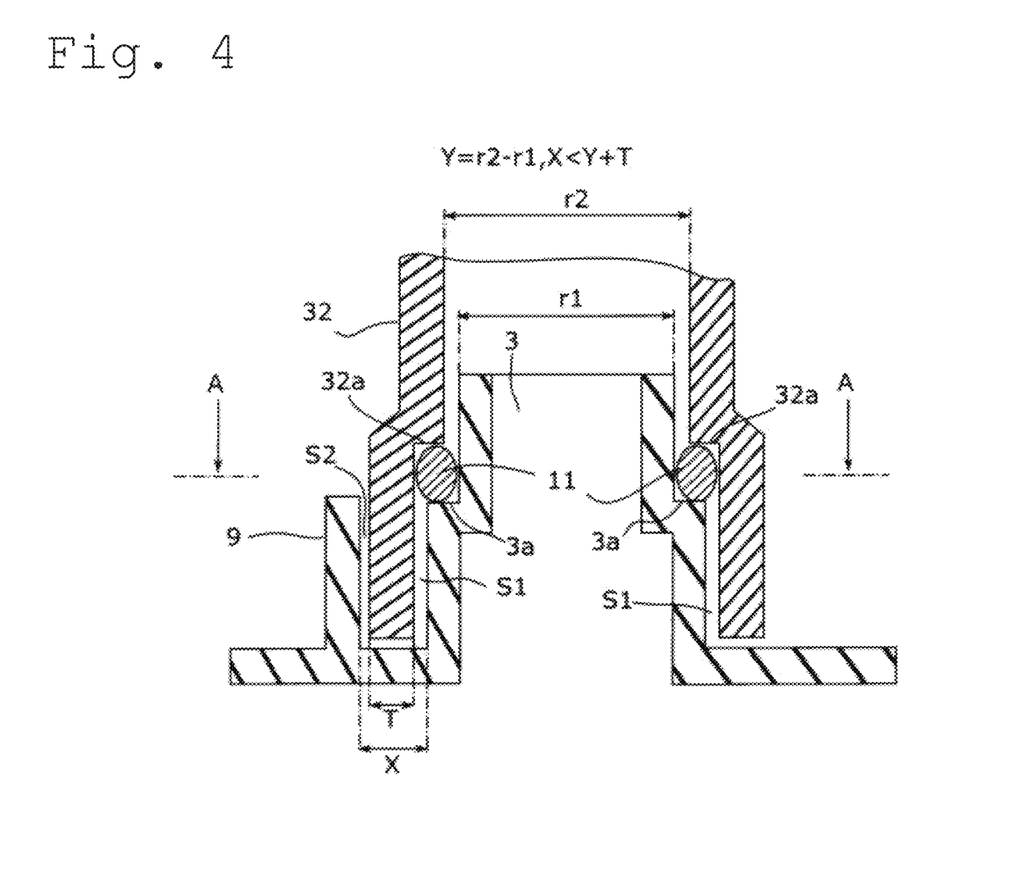
FIG. 4 is a cross-sectional view illustrating a connection state between a connecting port of the water outlet in FIG. 1 and a pipe connected to the connecting port.

As shown in FIG. 2, in a state in which the water outlet 100 is mounted on the vehicle, the protrusion 9 is located on the upper side of the second connecting port 3. In addition, the shape of the protrusion 9 is an arc shape as viewed from the front side (in plan view). The protrusion 9 is disposed so as to surround substantially a half-circumference portion of the upper side of the second connecting port 3 with a gap between the protrusion 9 and the second connecting port 3. As shown in FIG. 4, when the second connecting port 3 is inserted into the tip portion of the pipe 32, a part of the tip portion of the pipe 32 in the circumferential direction is sandwiched causing the gaps between the protrusion 9 and the second connecting port 3.

An O-ring 11 serving as a sealing member is interposed between the second connecting port 3 and the pipe 32 with a tightening allowance. The outer diameter of the tip portion of the second connecting port 3 is smaller than the other portions, and an annular step 3a is formed at a boundary portion where the outer diameter changes. The O-ring 11 is supported by the step 3a. An inner diameter of the tip portion of the pipe 32 is larger than the other portions, and an annular step 32a is formed at a boundary portion where the inner diameter changes. The O-ring 11 is prevented from coming off at the step 32a.

In FIG. 4, the outer diameter of the portion of the second connecting port 3 below the step 3a is smaller than the inner diameter of the portion of the pipe 32 below the step 32a, and the outer diameter of the portion of the second connecting port 3 above the step 3a is smaller than the inner diameter of the portion of the pipe 32 above the step 32a. In the present embodiment, in FIG. 4, a difference between the outer diameter of the portion of the second connecting port 3 below the step 3a and the inner diameter of the portion of the pipe 32 below the step 32a is equal to a difference between the outer diameter of the portion of the second connecting port 3 above the step 3a and the inner diameter of the portion of the pipe 32 above the step 32a.

If the second connecting port 3 can be inserted into the pipe 32, a dimensional difference between the outer diameter and the inner diameter can be changed appropriately.

As shown in FIG. 4, the gap between the second connecting port 3 and the protrusion 9 is denoted as X, a difference between the outer diameter r1 of the second connecting port 3 and an inner diameter r2 of the pipe 32 is denoted as Y (Y=r2−r1), and a wall thickness of the pipe 32 is denoted as T. Then, the gap X between the second connecting port 3 and the protrusion 9 is smaller than the sum of the difference Y between the outer diameter r1 of the second connecting port 3 and the inner diameter r2 of the pipe 32 and the wall thickness T of the pipe 32 (X<Y+T).

As a result, in a state in which the second connecting port 3 and the pipe 32 are aligned and disposed coaxially by the O-ring 11, a gap S2 between the protrusion 9 and the pipe 32 is smaller than a gap S1 between the pipe 32 and the second connecting port 3. Therefore, when the engine 20 and the water pump 50 vibrate during the running of the vehicle and the pipe 32 moves in one direction in the radial direction relative to the second connecting port 3, the pipe 32 comes into contact with the protrusion 9 before coming into contact with the second connecting port 3 thereby restricting further relative movement.

The thickness of the protrusion 9 is not particularly limited, but it is necessary to ensure strength when the protrusion 9 comes into contact with the pipe 32. Therefore, in this embodiment, the protrusion 9 is formed with a large thickness as shown in FIG. 2 and has a hollow structure to reduce weight, but it may also be a solid structure.

As described above, the water outlet 100 of the present embodiment is provided at the coolant outlet 21 of the engine 20 (internal combustion engine) and is connected to the pipe 32 which leads the coolant to the outside of the engine 20. The water outlet 100 includes the dish-shaped body 1, the tubular second connecting port 3, and the protrusion 9. The body 1 is fixed to the engine 20. The second connecting port 3 is provided so as to rise outwardly from the body 1 and is inserted into the pipe 32. The protrusion 9 is provided on the outer peripheral side of the second connecting port 3 so as to rise outwardly from the body 1. The annular O-ring 11 (sealing member) is provided between the second connecting port 3 and the pipe 32. At least a part in the circumferential direction of the pipe 32 is disposed between the protrusion 9 and the second connecting port 3.

According to the configuration described above, the protrusion 9 can suppress relative movement between the protrusion 9 and the second connecting port 3 in the radial direction. Therefore, with the water outlet 100, it is possible to prevent significant deterioration of the sealing performance obtained by the O-ring (sealing member) 11 which seals a space between the pipe 32 and the second connecting port 3 to which the pipe 32 is connected.

More in detail, as described above, the thermostat 40 is fixed to the water pump 50 with a bolt, and the water outlet 100 is fixed to the body of the engine 20 with a bolt. That is, the relative positions of the water outlet 100 to which one end of the pipe 32 is connected and the thermostat 40 to which the other end of the pipe 32 is connected are shifted according to a vehicle, that is, a mounting error occurs.

Therefore, in the water outlet 100 according to the present embodiment, in order to absorb the mounting error, the relative movement between the pipe 32 and the second connecting port 3 to which the pipe 32 is connected in the axial direction and the relative rotation in the circumferential direction are allowed by providing the difference (Y) between the outer diameter of the second connecting port 3 and the inner diameter of the pipe 32 and the annular gap S1 between the second connecting port 3 and the pipe 32 as shown in FIG. 4. In order to prevent a coolant from leaking from the gap S1, the O-ring 11 (annular sealing member) is provided between the second connecting port 3 and the pipe 32.

As shown in FIG. 2, the protrusion 9 is provided on the outer circumferential side of the second connecting port 3 so as to rise from the body 1 to the outside (the protruding side of the second connecting port 3).

As shown in FIG. 4, the protrusion 9 is disposed to face at least a part of the pipe 32 in the circumferential direction (the protrusion 9 faces a part of the second connecting port 3 when not connected to the pipe 32). Therefore, at least a part of the pipe 32 in the circumferential direction is disposed between the protrusion 9 and the second connecting port 3.

The pipe 32 is formed of such as a hardly deformable synthetic resin, the second connecting port 3 of the water outlet 100 is inserted into the inside of one end of the pipe 32, and the other end thereof is press-fitted and fixed to the thermostat 40. While a vehicle is running, the engine 20 to which the water outlet 100 is fixed and the water pump 50 to which the thermostat 40 is fixed vibrate up and down at certain frequencies. Then, the second connecting port 3 of the water outlet 100 and the pipe 32 move relatively in the radial direction.

When the relative movement between the second connecting port 3 and the pipe 32 in the radial direction increases, the pipe 32 comes into contact with the protrusion 9 to suppress further relative movement therebetween. Thus, it is possible to prevent a compression amount of a portion of the O-ring 11 (sealing member) in the circumferential direction from becoming extremely large and to prevent a compression amount (tightening allowance) of a portion on the opposite side thereof from becoming extremely small, thereby making it possible to prevent significant deterioration in the sealing performance of the portion.

Furthermore, when the pipe 32 is connected, a part of the tip portion of the pipe 32 in the circumferential direction may be connected so as to be sandwiched between the second connecting port 3 and the protrusion 9. As described above, since the protrusion 9 serves as a marker when the pipe 32 is connected, connection work of the pipe 32 can be easily performed.

In the water outlet 100 according to the present embodiment, the gap S1 is formed along the circumferential direction between the second connecting port 3 and the pipe 32. When the second connecting port 3 and the pipe 32 move relatively in the radial direction, the protrusion 9 is disposed at the position to come into contact with the pipe 32 before the pipe 32 comes into contact with the second connecting port 3.

In this way, when the gap S1 is formed between the second connecting port 3 and the pipe 32 along the circumferential direction, the movement along the axial direction and relative rotation in the circumferential direction between the second connecting port 3 and the pipe 32 are permitted, thereby making it possible to absorb a mounting error between a member to which one end of the pipe 32 is connected and a member to which the other end of the pipe 32 is connected.

Furthermore, the relative movement between the second connecting port 3 and the pipe 32 in the radial direction is also permitted by the gap S1. Therefore, when a member to which one end of the pipe 32 is connected and a member to which the other end thereof is connected vibrate separately, the relative movement between the second connecting port 3 and the pipe 32 in the radial direction is also permitted, thereby making it possible to suppress deterioration in durability due to a load applied to a connecting portion of the pipe 32.

Figure 6:
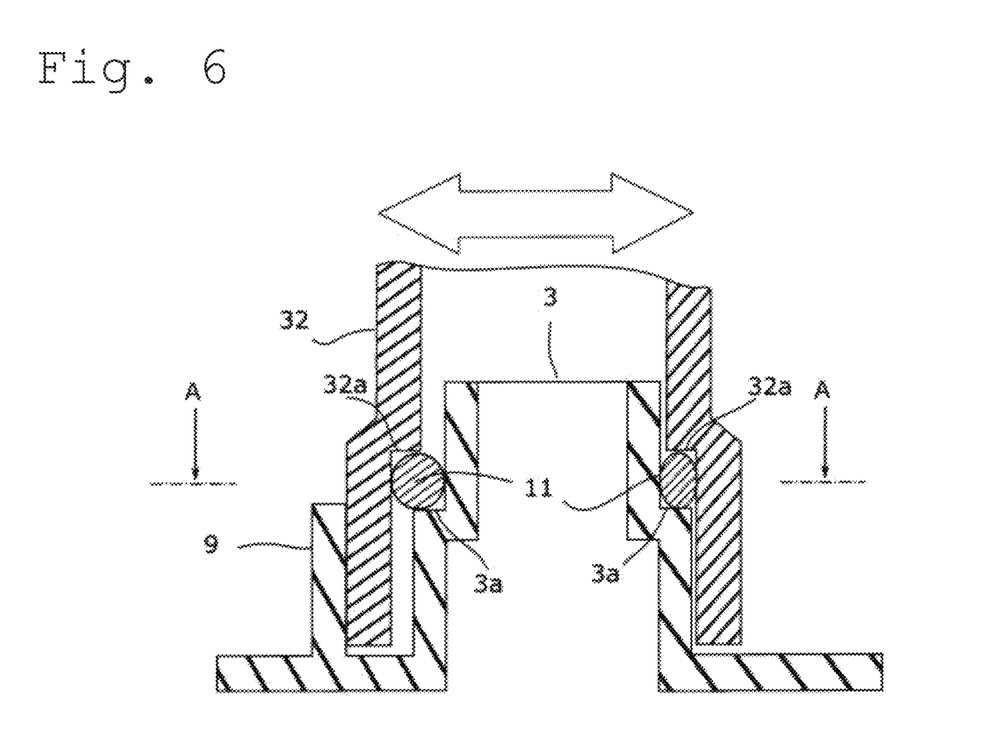
FIG. 6 is a cross-sectional view illustrating a state in which the connecting port of the water outlet and the pipe are relatively moved in the radial direction from the state in FIG. 4.
Figure 7:
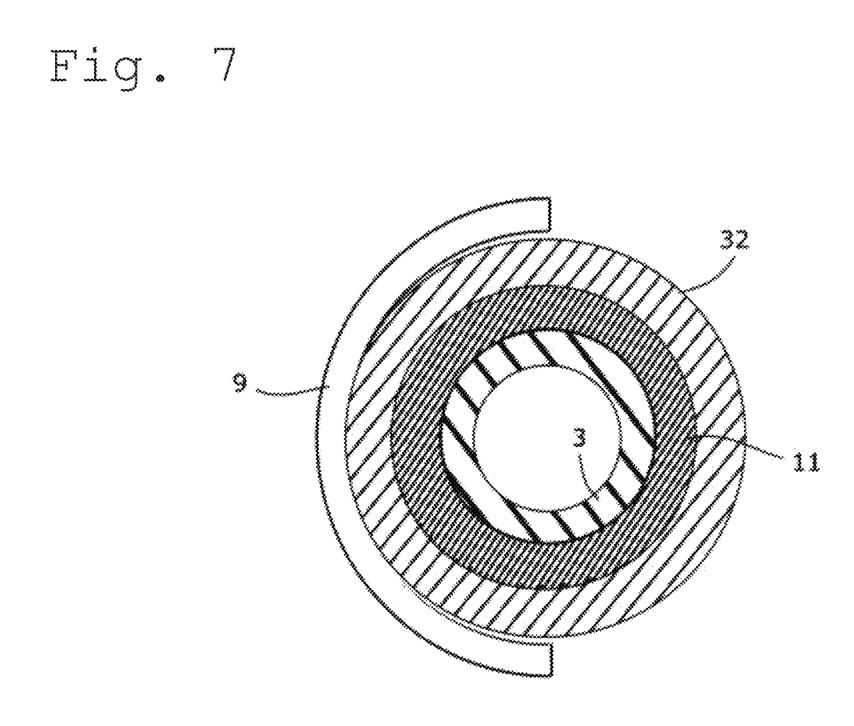
FIG. 7 is a cross-sectional view taken along line A-A in FIG. 6.

Furthermore, when the amount of relative movement in the radial direction between the second connecting port 3 and the pipe 32 increases, the pipe 32 comes into contact with the protrusion 9 before the pipe 32 comes into contact with the second connecting port 3. Therefore, it is possible to reliably suppress an increase in the amount of relative movement in the radial direction between the second connecting port 3 and the pipe 32, and it is possible to reliably prevent a significant deterioration in the sealing performance of the O-ring 11.

More specifically, the distance X between the inner circumferential surface of the protrusion 9 and the outer circumferential surface of the second connecting port 3 is formed to be smaller than the sum of the difference Y between the inner diameter r2 of the pipe 32 and the outer diameter r1 of the second connecting port 3 and the thickness T of the pipe 32 (X<Y+T). As a result, when the relative amount of movement of the second connecting port 3 and the pipe 32 in the radial direction increases, the pipe 32 can come into contact with the protrusion 9 before the pipe 32 comes into contact with the second connecting port 3.

Furthermore, as shown in FIGS. 2 and 4, the protrusion 9 is formed in the arc shape in plan view when viewed from the axial direction of the second connecting port 3.

As a result, the protrusion 9 can suppress the warping of the flange 4 in a direction away from the body of the engine 20 by the reaction force of the gasket 6. Further, when the pipe 32 is connected to the water outlet 100, the protrusion 9 can be used as a guide for guiding the pipe 32. Furthermore, as compared with a case in which the protrusion 9 is an annular shape, the protrusion 9 does not cause interference when the second connecting port 3 is inserted into the pipe 32. Therefore, the connection work of the pipe 32 can be facilitated.

Figure 5:
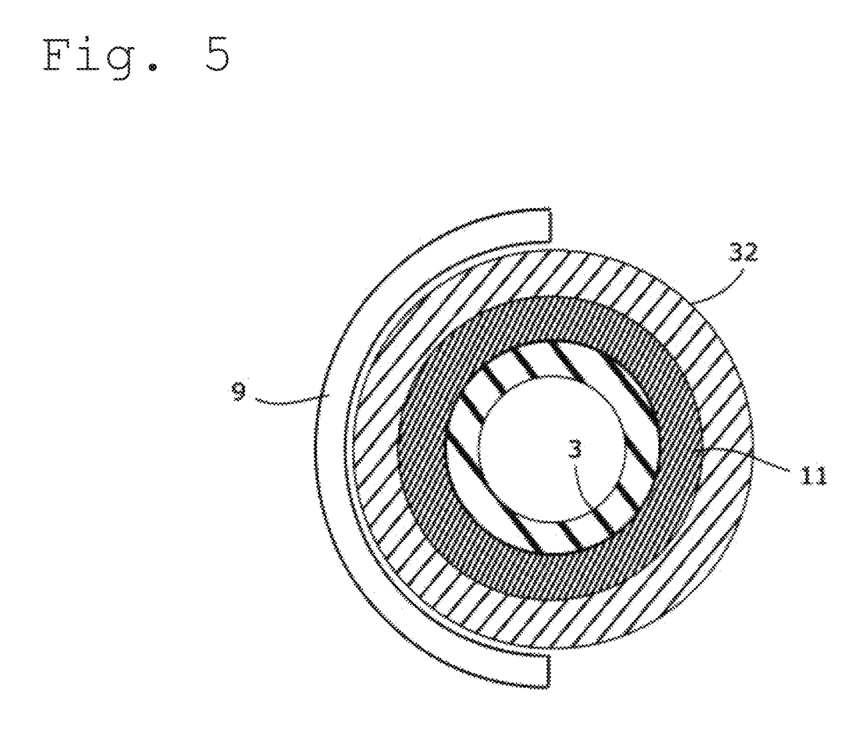
FIG. 5 is a cross-sectional view taken along line A-A in FIG. 4.

As shown in FIG. 5, the protrusion 9 is disposed along a concentric circle of the second connecting port 3 so as to cover a half circumferential portion of the second connecting port 3.

As a result, deterioration of the sealing performance of the gasket 6 can be suppressed when the flange 4 is warped in a direction away from the body of the engine 20 by the reaction force of the gasket 6. In addition, even if a vibration direction changes slightly while the vehicle is running, an increase in the relative movement amount of the second connecting port 3 and the pipe 32 in the radial direction can be suppressed. Therefore, even if the vibration direction changes slightly while the vehicle is running, the remarkable deterioration of the sealing performance of the O-ring 11 is suppressed.

It is noted that the length in the circumferential direction and the shape of the protrusion 9 can be appropriately changed. For example, the protrusion 9 may include a plurality of projections and may be disposed at a distance from the second connecting port 3, and the protrusion 9 may have a shape including one projection or an annular projection line.

In the water outlet 100 of the present embodiment, the annular gasket 6 is provided between the body 1 and the engine 20 so as to surround the coolant outlet of the engine 20. The both ends of the protrusion 9 in the circumferential direction are located on the outer circumferential side of the gasket 6.

As a result, the effect of suppressing warpage of the flange 4 is further improved, and the sealing performance between the water outlet 100 and the body of the engine 20 can be maintained.

Furthermore, in the present embodiment, since both ends of the protrusion 9 in the circumferential direction reach the outer peripheral edge of the body 1, the effect of suppressing the warpage of the flange 4 is improved, but the length in the circumferential direction and the shape of the protrusion 9 can be changed appropriately.

Furthermore, the thickness of the protrusion 9 is not particularly limited, but it is necessary to ensure strength when the protrusion 9 comes into contact with the pipe 32. Therefore, in the present embodiment, the thickness of the protrusion 9 is formed to be large, as shown in FIG. 2, and then a hollow structure having a hollow portion therein is provided, for example, for weight reduction.

As shown in FIG. 4, the tip of the protrusion 9 in the height direction is formed to be at the same height as that of the O-ring 11. Accordingly, even when the O-ring 11 is provided between the second connecting port 3 and the pipe 32, the second connecting port 3 can be easily inserted into the pipe 32. In addition, the second connecting port 3 can be easily guided into the pipe 32 by the protrusion 9. Therefore, the connecting work of the pipe 32 can be more easily performed.

It should be noted that the height of the protrusion 9 can be appropriately varied. Furthermore, although in the above embodiments, although the protrusion 9 is erected perpendicular to the surface of the flange 4, in the present invention, the protrusion 9 is not limited to this configuration. For example, when the protrusion 9 is formed in an arc shape in plan view, a diameter thereof may be increased toward an upper portion. In this case, when the second connecting port 3 of the water outlet 100 and the pipe 32 are connected to each other, the protrusion 9 can be easily connected without hindrance.

A rib may be formed in the axial direction or the circumferential direction on the inner peripheral surface of the protrusion 9, not shown in FIGS. 2 and 3, and in this case, the strength of the protrusion 9 can be further improved.

In this embodiment of the water outlet 100, a temperature sensor 7 is attached to the body 1, and a pair of walls 5a, 5b located on both sides with the temperature sensing unit 7a of the temperature sensor 7 therebetween come closer to each other as they move toward the bottom of the body 1.

As a result, the temperature sensing performance of the temperature sensor 7 can be improved. It should be noted that the wall portions 5a and 5b may have a straight shape, and the temperature sensor 7 may be omitted.

In the water outlet 100 of the present embodiment, the pipe 32 conducts a coolant to the thermostat 40, which is fixed to the water pump 50 which sends the coolant to the engine 20. As described above, the water outlet 100 is fixed to the engine 20.

As described above, when one end of the pipe 32 is connected to the water outlet 100 fixed to the engine 20, and the other end thereof is connected to the thermostat 40 fixed to the water pump 50, and the pipe 32 is made of a hardly deformable synthetic resin, it is preferable to form the annular gap S1 between the pipe 32 and the second connecting port 3 so as to be able to absorb a mounting error.

In such a case, the second connecting port 3 and the pipe 32 move relatively in the radial direction due to vibration during the running of the vehicle, and the sealing performance of the O-ring 11 may be significantly deteriorated. Therefore, it is particularly effective to provide the protrusion 9 in the water outlet 100.

In a state in which the water outlet 100 according to the present embodiment is mounted on the vehicle, the protrusion 9 is located on the upper side of the second connecting port 3.

As described above, when the other end of the pipe 32 having one end connected to the water outlet 100 fixed to the engine 20 is connected to the thermostat 40 fixed to the water pump, the pipe 32 and the second connecting port 3 to which the pipe 32 is connected move relatively mainly in the vertical direction while the vehicle is running. Since the relative movement in the vertical direction can be suppressed by the protrusion 9, it is possible to efficiently suppress significant deterioration in the sealing performance of the O-ring 11. A similar effect can be obtained when the protrusion 9 is located at the lower side of the second connecting port 3.

It should be noted that a location at which the protrusion 9 is provided is not limited to a location at the upper and lower side of the second connecting port 3, and may be changed accordingly. Furthermore, the protrusion 9 may come into contact with the pipe 32 in a state before vibration is applied while the vehicle is running.

In the present embodiment, the protrusion 9 is provided corresponding to the second connecting port 3. The pipe 32 is connected to the second connecting port 3. The pipe 32 serves as a bypass path that directs a coolant, which is discharged from the engine 20 and does not pass through the radiator 30, to the thermostat 40. However, the protrusion 9 may be provided corresponding to the first connecting port 2 to which the pipe 31 directing the coolant to the radiator 30 is connected. The protrusion 9 may be provided corresponding to a connecting port to which a pipe directing the coolant to another device such as a heater core is connected.

Although the preferred embodiments of the present invention have been described above in detail, modifications, variations, and changes may be made without departing from the scope of the claims.

REFERENCE SIGNS LIST

1 Body
2 First connecting port
3 Second connecting port (connecting port)
3a Step
4 Flange (mounting portion)
5 Dish portion
5a Wall portion
5b Wall portion
7 Temperature sensor
7a Temperature sensing unit
9 Protrusion
11 O-ring (sealing member)
20 Engine (internal combustion engine)
21 Coolant outlet
30 Radiator
31 Pipe
32 Pipe
32a Step
40 Thermostat
41 First inlet
42 Second inlet
43 Outlet
50 Water pump
100 Water outlet

The invention claimed is:

1. A water outlet provided at a coolant outlet of an internal combustion engine and configured to allow a pipe to be connected thereto, the pipe leading a coolant to an outside of the internal combustion engine; the water outlet comprising:
 a dish-shaped body fixed to the internal combustion engine;
 a tubular connecting port provided so as to rise outwards from the body and inserted into the pipe; and
 a protrusion provided on an outer peripheral side of the connecting port so as to rise outwards from the body, wherein
 an annular seal member is provided between the connecting port and the pipe,
 at least a part of the pipe of a circumferential direction is disposed between the protrusion and the connecting port, and
 the protrusion is formed in an arc shape in plan view when seen from an axial direction of the connecting port.

2. The water outlet according to claim 1, wherein
 a gap is formed between the connecting port and the pipe along the circumferential direction, and
 the protrusion is disposed at a location so as to come into contact with the pipe before the connecting port and the pipe come into contact with each other when the connecting port and the pipe move relatively in a radial direction.

3. The water outlet according to claim 1, wherein the protrusion is formed to cover a half circumference portion of the connecting port along a concentric circle of the connecting port.

4. The water outlet according to claim 1, wherein
 an annular gasket is provided between the body and the internal combustion engine so as to surround the coolant outlet of the internal combustion engine, and
 both ends of the protrusion in the circumferential direction are located on an outer circumferential side of the gasket.

5. The water outlet according to claim 1, wherein a tip of the protrusion in a height direction is located at the same height as the height of the sealing member.

6. The water outlet according to claim 1, wherein
 a temperature sensor is mounted on the body, and
 a pair of walls located on both sides, with the temperature sensing unit of the temperature sensor therebetween, is closer to each other toward the bottom of the body.

7. The water outlet according to claim 1, wherein the pipe conducts the coolant to a thermostat attached to a water pump which sends the coolant to the internal combustion engine.

8. The water outlet according to claim 1, wherein the protrusion is located on an upper side or a lower side of the connecting port in a state of being mounted on a vehicle.

* * * * *